US008025498B2

(12) United States Patent
Haase et al.

(10) Patent No.: US 8,025,498 B2
(45) Date of Patent: Sep. 27, 2011

(54) ROTARY TABLETING PRESS

(75) Inventors: Helmut Haase, Linum (DE); Wolfgang Korsch, Berlin (DE); Helmut Zeddies, Berlin (DE); Stephen Mies, Berlin (DE); Walter Hegel, Berlin (DE); Peter Weisbach, Berlin (DE); Alf Gärtner, Berlin (DE)

(73) Assignee: Korsch AG, Berlin (DE)

( * ) Notice: Subject to any disclaimer, the term of this patent is extended or adjusted under 35 U.S.C. 154(b) by 34 days.

(21) Appl. No.: 12/424,537

(22) Filed: Apr. 16, 2009

(65) Prior Publication Data

US 2009/0263532 A1 Oct. 22, 2009

(30) Foreign Application Priority Data

Apr. 18, 2008 (DE) ......................... 10 2008 020 759

(51) Int. Cl.
*B29C 43/08* (2006.01)

(52) U.S. Cl. ......................... 425/345; 425/256; 425/451

(58) Field of Classification Search .................... 425/78, 425/256–261, 130, 345, 451
See application file for complete search history.

(56) References Cited

U.S. PATENT DOCUMENTS

| | | | | |
|---|---|---|---|---|
| 2,970,554 | A | 2/1961 | Haupt | |
| 3,063,390 | A | 11/1962 | Frank | |
| 3,460,487 | A | 8/1969 | Kibbe | |
| 3,887,317 | A * | 6/1975 | Plocher et al. | 425/257 |
| 5,151,280 | A | 9/1992 | Arndt et al. | |
| 5,322,655 | A | 6/1994 | Ebey | |
| 5,350,548 | A * | 9/1994 | Hinzpeter et al. | 425/345 |
| 6,382,947 | B1 * | 5/2002 | Bryant | 425/130 |
| 6,676,863 | B2 | 1/2004 | Christiaens et al. | |
| 6,972,105 | B2 * | 12/2005 | Boeckx et al. | 425/345 |
| 2003/0042639 | A1 | 3/2003 | Christiaens et al. | |
| 2009/0142438 | A1 * | 6/2009 | Roemer et al. | 425/344 |

FOREIGN PATENT DOCUMENTS

| | | | |
|---|---|---|---|
| DE | 967423 | C | 11/1957 |
| DE | 102004040163 | B | 5/2006 |
| DE | 102005030311 | B3 | 11/2006 |
| EP | 2065176 | A2 | 6/2009 |
| JP | 2002301597 | | 10/2002 |
| WO | 9925545 | | 5/1999 |

* cited by examiner

*Primary Examiner* — Richard Crispino
*Assistant Examiner* — Thukhanh Nguyen
(74) *Attorney, Agent, or Firm* — Perkins Coie LLP

(57) ABSTRACT

The invention relates to a rotary tableting press comprising a rotor, at least one filling station and at least one pressure station as well as lower and upper ram guides. The rotary tableting press has a modular design, such that individual modules are arranged so they can be removed and/or converted within the rotary tableting press for retooling the rotary tableting press from two-layer operation to single-layer operation or vice-versa.

9 Claims, 8 Drawing Sheets

ROTARY TABLETING PRESS

CROSS REFERENCE TO RELATED APPLICATION

This application claims priority of and incorporates by reference German patent application no. 10 2008 020 759.4 filed Apr. 18, 2008.

BACKGROUND

Rotary tableting presses are sufficiently well known. They usually comprise a rotor having a female mold table with a number of female molds arranged on a circumferential line. An upper ram and a lower ram are assigned to each female mold and are guided by guide cams. A material to be compressed can be added to the female molds through at least one filling device. The upper ram and lower ram are guided over a filling station, a metering station, a prepressure station and a main pressure station.

Rotary tableting presses with which multilayer tablets, e.g., two-layer tablets, can be produced are also known. Two filling stations, two metering stations and two pressure stations are arranged around the circumference of the rotor.

Rotary tableting presses for laboratory operation in particular, which can be retooled from a single-layer operation to a two-layer operation, are also known. These require relatively complex retooling work, namely placement of a second filling spout and adaptation of the first pressure station, the metering unit cams and the filling cams.

SUMMARY

An embodiment of the invention provides a rotary tableting press of the generic type, which will be characterized by a simple and variable design.

It is advantageously possible to retool a rotary tableting press rapidly and in a versatile manner because the rotary tableting press has a modular design, with individual modules being arranged so they can be removed and/or converted for retooling of the rotary tableting press from two-layer operation to single-layer operation or vice-versa. The rotary tableting press can thus be used in a variety of ways, in particular as a laboratory press, and may thus be adapted quickly to different desired parameters. This pertains to the replacement of individual components as well as quick retooling from single-layer operation to two-layer operation and/or vice-versa.

In a preferred embodiment of the invention, a first filling device and a second filling device are provided, with the second filling device being removable. This makes it advantageously possible that by removing the second filling device, e.g., by dismantling or by pivoting it into a non-use position, conversion of the tableting press from a two-layer operation to a single-layer operation can take place very rapidly and in particular also without the use of tools.

Furthermore, in a preferred embodiment of the invention, the first filling device can be equipped with an enlarged filling spout—in single-layer operation with the rotary tableting press. This advantageously makes it possible to operate the rotor at a higher rotational speed during single-layer operation without interfering with reliable filling of the female molds.

In addition, in another preferred embodiment of the invention, a lower pressure roll of a second pressure station in two-layer operation takes on a metering function for filling the female molds in single-layer operation. This advantageously permits effectively support for retooling of the tableting press from two-layer operation to single-layer operation while at the same time allowing multifunctional use of certain components, i.e., for both two-layer operation and single-layer operation.

Furthermore, in a preferred embodiment of the invention, the upper ram guide comprises multiple segments, each at least partially interchangeable with at least one other segment having a different cam characteristic. Owing to this segmentation of the ram guide, retooling from two-layer operation to single-layer operation and/or vice-versa can be implemented easily. Depending on which operating modes are to be implemented in operation, the corresponding segments are used for guiding the upper ram. The longer filling distance may be supported in a single-layer mode in this way.

In another preferred embodiment of the invention, the rotary tableting press comprises drive adapters which are optionally operatively connectable to drive shafts for driving filling devices and/or parts of filling devices. Remodeling of the filling zone from two-layer operation to single-layer operation and/or vice-versa can be supported easily in this way. In particular, no complex assembly work may be conducted. The available drive adapters are optionally either coupled to the corresponding drive shafts or not.

In addition, in a preferred embodiment of the invention, the rotor can be pivoted out of a press interior of the rotary tableting press. It is advantageously possible in this way to either replace the entire rotor or to replace the segments of the ram guides on the rotor itself, for example, and/or to adapt the upper ram and/or lower ram according to the desired parameters of the tablets to be pressed. In addition, maintenance and/or cleaning jobs can easily be performed on the rotor and/or on the interior of the press.

Furthermore, in a preferred embodiment of the invention, the rotor comprises a receptacle for a support arm, whereby the support arm is pivotably arranged with a guide pillar of the rotary tableting press, where a lifting mechanism is preferably integrated into the support arm for lowering and/or raising the rotor. This advantageously permits dismantling and/or installation of the motor without the use of any additional external equipment and/or tools.

The present invention thus relates to a rotary tableting press that can be used universally, in particular a modular design laboratory press equipped for replacement of a complete rotor with only a few manipulations or for retooling the rotor and the necessary peripherals from a two-layer operation to a single-layer operation and vice-versa.

Essential to the invention here is, first of all, the simple and uncomplicated operation of retooling from two-layer operation to single-layer operation. This requires only the removal of the top pressure roll for pressing on the first layer—in two-layer operation—and the cam segments of the upper ram adjacent to the top pressure roll in two-layer operation. These cam segments are replaced for a cam segment having a straight guide for the upper ram. Furthermore, the filling devices for the first layer and the second layer are removed and/or refunctionalized. It is thus possible to easily use the metering unit of the filling station for the first layer in two-layer operation simultaneously with filling of the female molds in single-layer operation. It is thus possible in single-layer operation to lengthen the filling zone easily by lengthening the filling cam in this metering. Replacement of the metering unit is not necessary. The bottom pressure roll for pressing the first layer assumes the function of a metering unit and therefore need not be dismantled or retooled. A longer filling zone for female molds is likewise possible by arranging an additional stirrer blade of a filling spout for single-layer operation, so that there may be an increase in the input speed/working speed of the rotor. Retooling of the laboratory press from two-layer operation to single-layer operation and/or vice-versa can thus be accomplished within the shortest possible amount of time, as needed. Complex breakdown and/or dismantling and assembly jobs are not necessary here. The few coordinated replacement parts can easily be positioned, primarily even without the use of tools.

Another aspect of the present invention is the replaceability of the complete rotor of the rotary tableting press without complex dismantling work. To do so, the rotor is pivoted laterally out of its operating position. This means that the rotor is not raised but instead remains in its elevated position. In this way, pivoting of the pressure rolls and dismantling of the guide cam for the rams and the rams themselves can be omitted. It is necessary only to remove the filling cam because in this area the lower rams engaging therein would stand in the way of pivoting the rotor out laterally.

In its operating position, the rotor is connected in a non-positive manner to the drive and/or the counter bearing on its drive shaft ends by mechanically acting connecting elements, e.g., connecting elements that are pneumatically or hydraulically operable so that accurate and reproducible positioning of the rotor is possible. For dismantling, the rotor is connected to a support arm and is pivoted outward about a column of the laboratory press fixedly mounted on the frame, as stated, without any change in height. After being pivoted outward, the rotor may then be placed on a rotor wagon or the like by means of a lowering device, e.g., mechanically, hydraulically or pneumatically. Replacement of the rotor, e.g., for repairs and/or maintenance purposes or for cleaning purposes or the like, is thus readily possible in a simple manner.

BRIEF DESCRIPTION OF THE DRAWINGS

The basic principle of the invention is illustrated on the basis of the following figures. They show.

DETAILED DESCRIPTION

Figure 1:
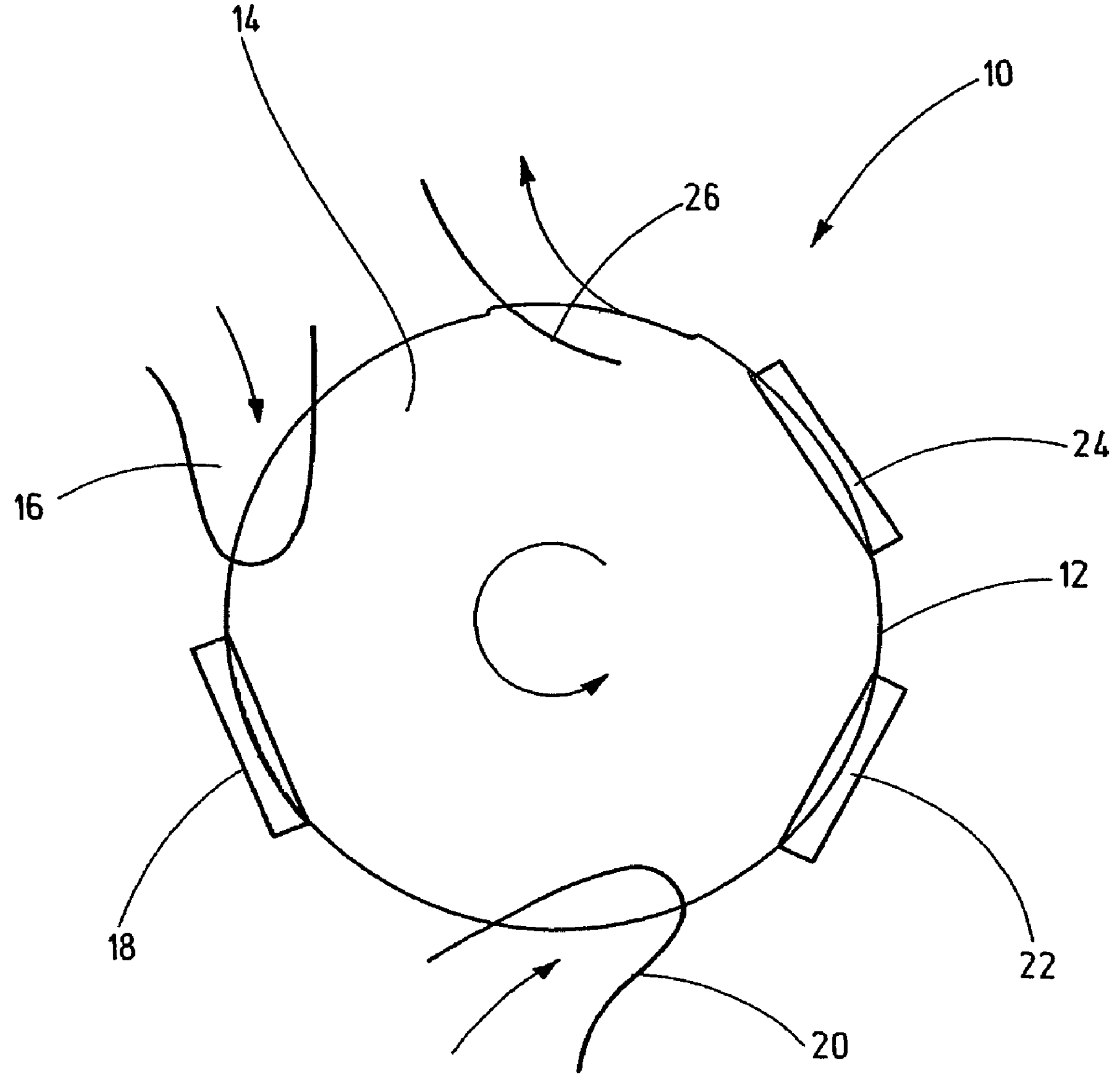
FIG. 1 a schematic view from above of a rotary tableting press in two-layer operation.

FIG. 1 shows a highly schematic view from above of a rotary tableting press for production of two-layer tablets. The tableting press is labeled as 10 on the whole. The tableting press 10 comprises a rotor 12, the one female mold table 14 with female molds arranged therein (not shown here) on a circumferential line. Upper rams and lower rams (also not shown) is assigned to each female mold. The tableting press 10 comprises, in this order, a first filling device 16, a first pressure station 18, a second filling device 20, a second pressure station 22 and a main pressure station 24 as well as an ejector 26, as seen in the circumferential direction. A medium, in particular powder to be pressed for a first layer of a tablet to be pressed is supplied via the first feed mechanism 16'. This first layer is prepressed via the first pressure station 18. Next, the medium to be pressed, in particular another powder, is applied to the prepressed first layer, via the second filling device 20. Next, via the second prepressure station 22, the tablet is pressed, now comprising two layers. The main pressure station 24 performs the final pressing of the two-layer tablet and the finished pressed two-layer tablets are sent by the ejector 26 to a collecting container or the like.

Figure 2:
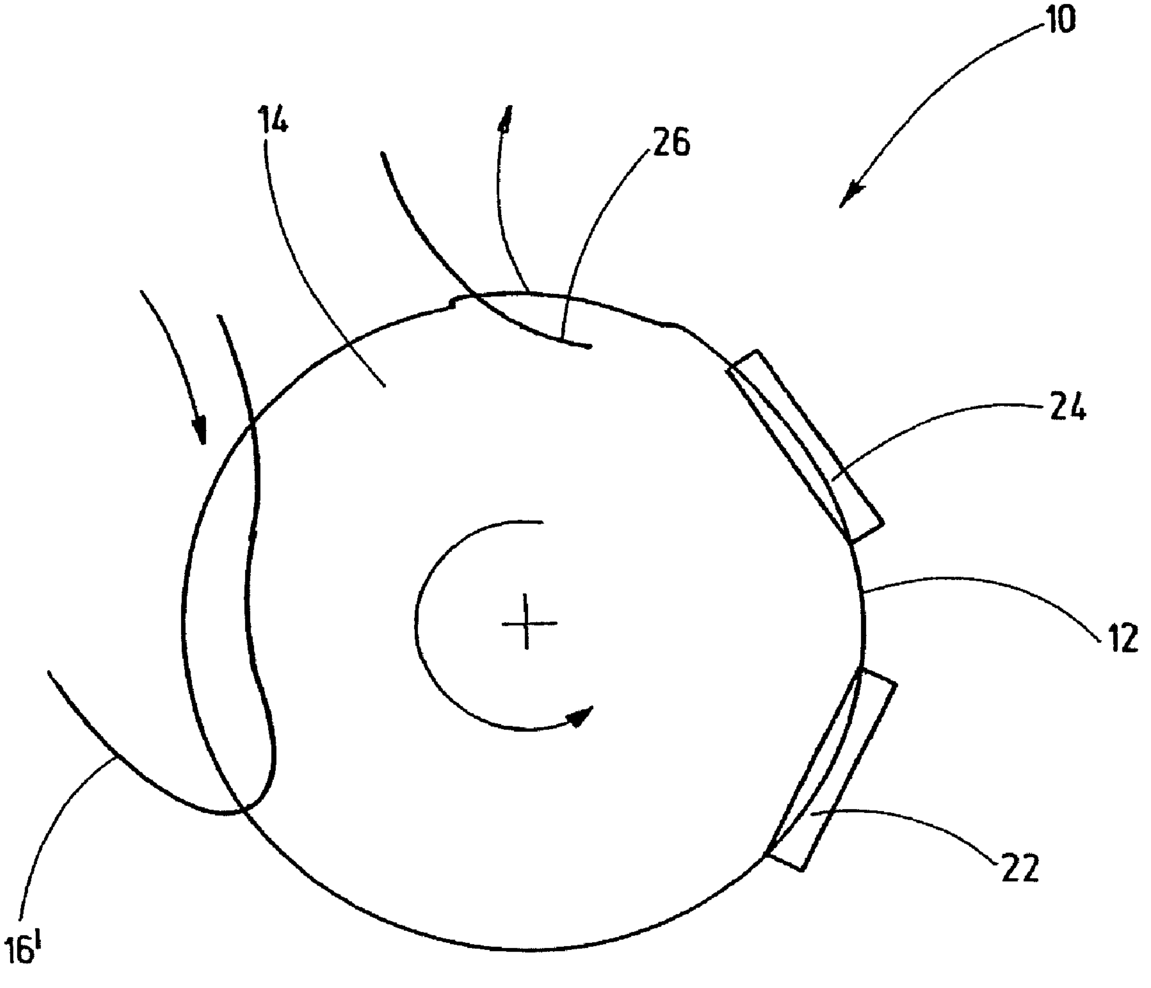
FIG. 2 a schematic view from above of a rotary tableting press in single-layer operation.

FIG. 2 shows the tableting press 10 in another highly schematic diagram in the retooling variant for a single-layer operation. The same parts as in FIG. 1 are provided with the same reference numerals and will not be explained further here.

It is clear that the second filling device 20 here is removed and/or shifted out of the operative area of the rotor 12. Likewise the upper pressure roll of the first pressure station 18 is removed. The first feed mechanism 16' is either retained or is equipped with a larger filling spout, as shown here. This permits filling of the female molds on a larger portion of the circumference of the partial circle of the female mold table 14. The lower pressure roll of the first pressure station 18 here takes over the metering function for control of the lower ram for metered feed of a specific quantity into the female mold, in accordance with general practice.

It is clear from the schematic diagrams in FIGS. 1 and 2 that it is possible to retool the tableting press 10 from two-layer operation (diagrammed in FIG. 1) to single-layer operation (diagrammed in FIG. 2) in only a few retooling steps. This retooling can be performed very rapidly because no complex assembly work is required.

Figure 3:
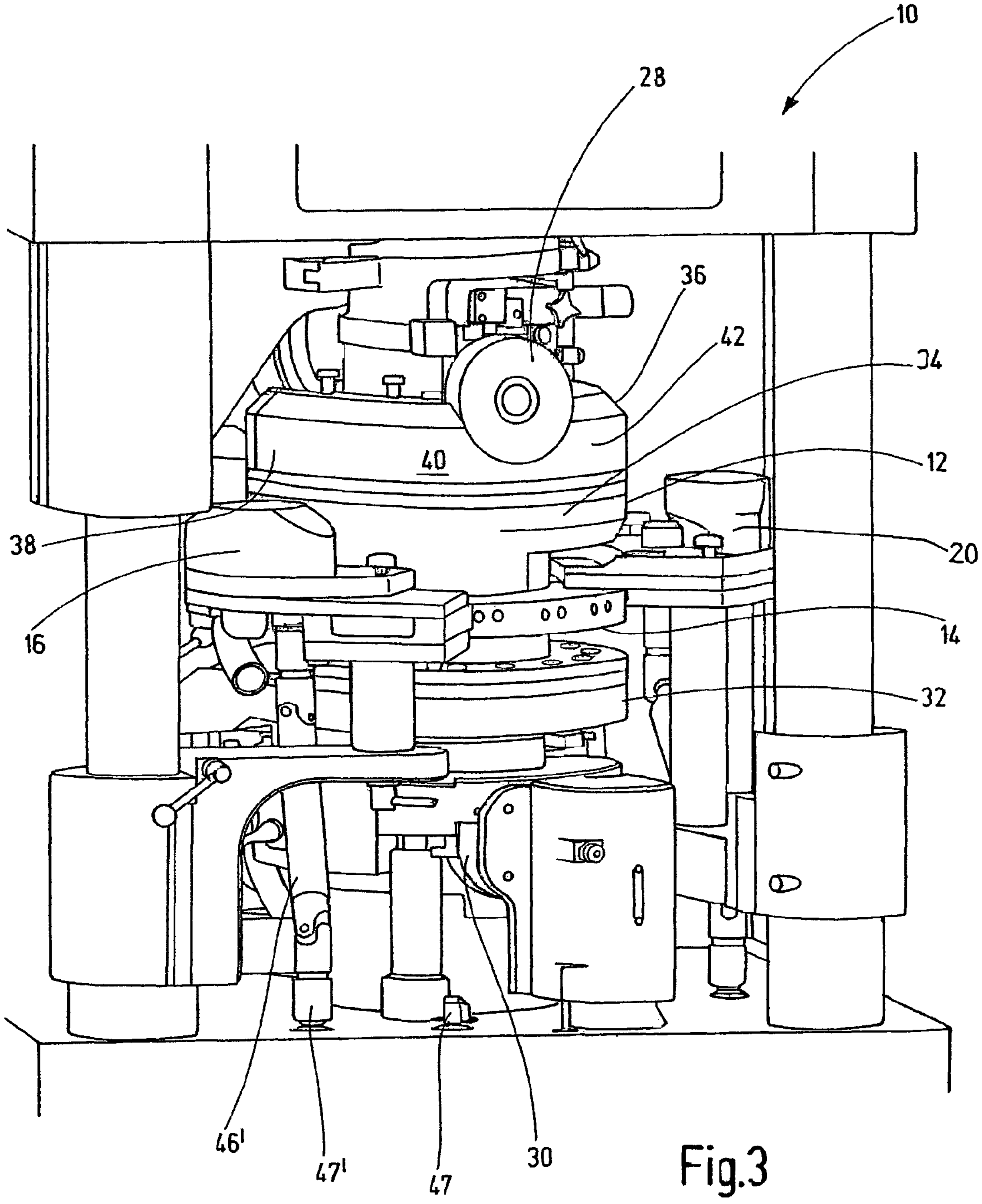
FIG. 3 a schematic perspective view of the tableting press in two-layer operation.

FIG. 3 shows a schematic perspective view of the tableting press 10 in the functional state "two-layer operation." The first feed mechanism 16', the top pressure roll 28 and the bottom pressure roll 30 of the first pressure station 18 and the second filling device 20 are shown.

Furthermore, the rotor 12 with the female mold table 14 is visible. The rotor 12 also comprises a lower ram guide 32 and an upper ram guide 34. The lower ram and the upper ram are displaced by guide cams in their position relative to the female mold table in an essentially known manner. The metering, pressing and ejection of tablets can be controlled in this way. The upper ram cam 36 is diagrammed schematically in FIG. 3, comprising different segments. A segment 38, a segment 40 and a segment 42 can be discerned. The segment 38 is arranged above the feed mechanism 16', where the upper ram is guided essentially in a certain starting position. The segment 40 by which the upper ram is guided into the prepressure position is arranged upstream from the pressure roll 28. The segment 42 guides the upper ram connected to the pressure roll 28 out of the prepressure position into the filling position according to the arrangement of the second filling device 20. This is essentially known.

Figure 4:
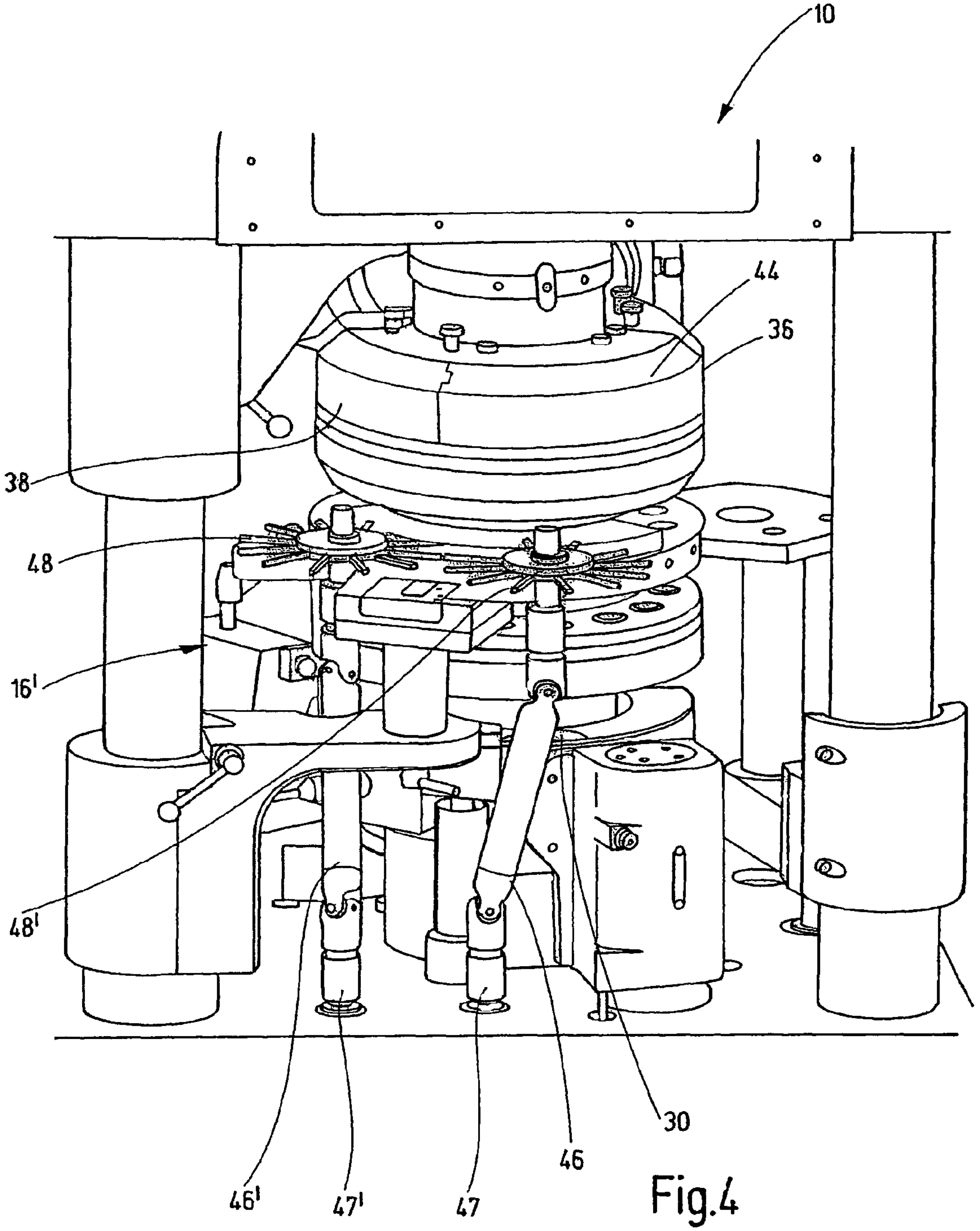
FIG. 4 a schematic perspective view of the tableting press in single-layer operation.

FIG. 4 shows the tablet press 10 in a schematic perspective view in its operating state of "single-layer operation." The same parts are again provided with the same reference numerals and are not explained further. It is clear that the top pressure roll 28 and the segments 40 and 42 of the upper ram guide 36 have been removed. The segments 40 and 42 have been replaced by a new segment 44, so that the upper ram is also guided in the area of the current segment 44 into a filling position, i.e., above the female molds.

FIG. 4 also illustrates that the second filling device 20 has been removed. A drive shaft 46 of the second filling device 20 (FIG. 3) has been released and placed in a new position, as illustrated in FIG. 4. The first feed mechanism 16 is replaced with a feed mechanism 16', of which only the stirrer blades 48 of a corresponding filling spout are shown here for illustration. The drive shaft 46 now serves to drive the second stirrer blade 48', while the drive shaft 46' of the first feed mechanism 16 (FIG. 3) remains and now serves to drive the first stirrer blade 48. The first feed mechanism 16 is more or less retained and is supplemented by the second stirrer blade 48'. Corresponding drive adapters 47 and/or 47' are provided in a base plate 11, being operatively connected and/or connectable to the drive shafts 46 and/or 46'. The lower pressure roll 30 of the first pressure station 18 (FIG. 1 and/or FIG. 3) now takes up the metering function to trigger the lower ram via the partial circle of the feed mechanism 16'. It is clear that a longer filling zone is easily created in this way during single-layer operation, so that reliable filling of all female molds is possible, even at high rotational speeds.

All the other components of the tableting press 10 remain unchanged and are functional in both two-layer operation and single-layer operation.

Figure 5:
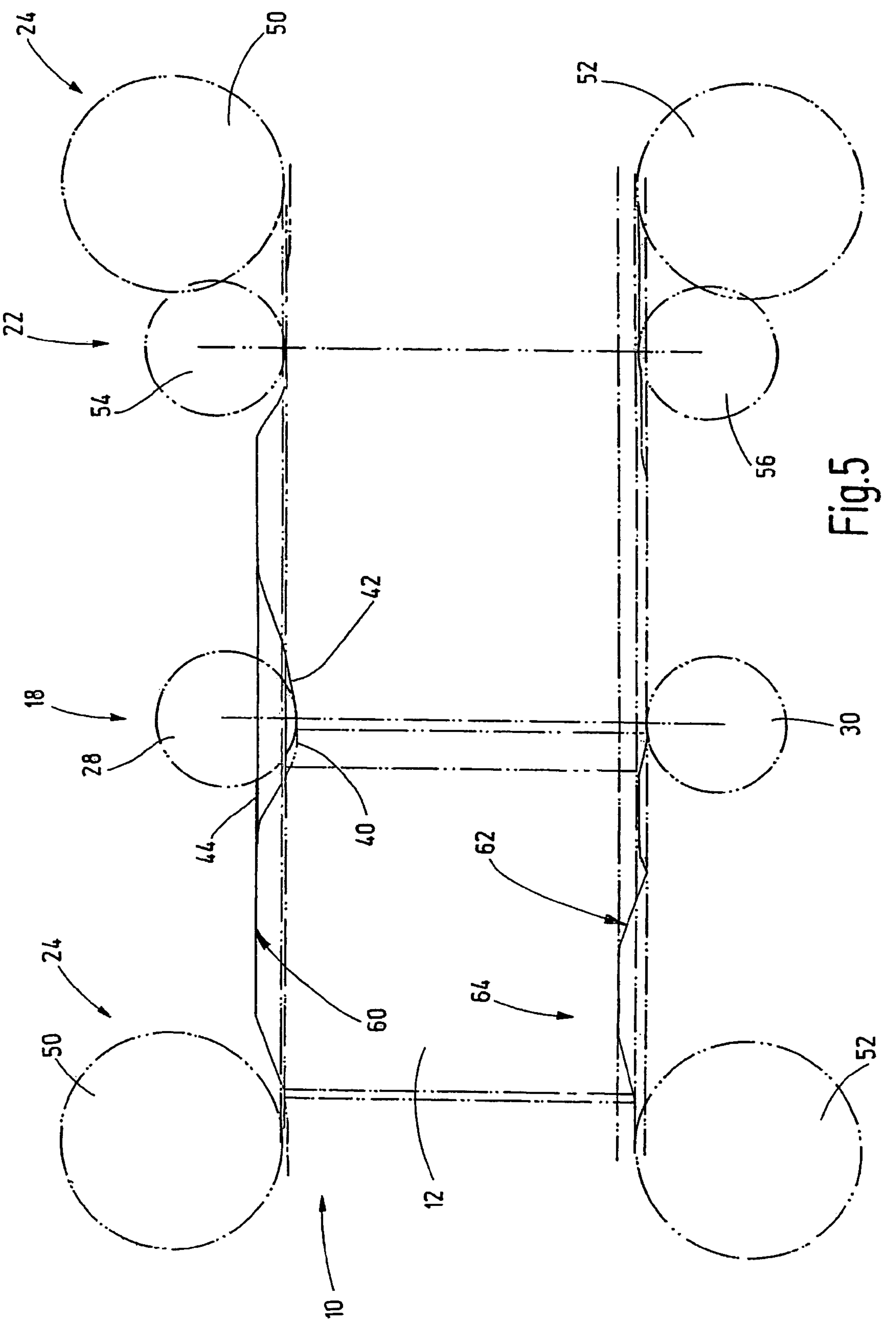
FIG. 5 a comparison of the cams for two-layer operation and single-layer operation and FIGS. 6 to 8 schematic perspective views of the tableting press, showing the peripherals that can be pivoted and/or dismantled.

FIG. 5 shows schematically the developed view of the rotor 12 of the tableting press 10. The main pressure station 24 with the upper main pressure roll 50 and the lower main pressure roll 52 can be seen. Furthermore, the first prepressure and/or initial pressure station 18 and the second prepressure and/or initial pressure station 22 are also shown. The first prepressure station 18 has the upper pressure roll 28 and the lower pressure roll 30. The second prepressure station 22 has the upper pressure roll 54 and the lower pressure roll 56. This also shows the developed view of the upper ram cam 60 and/or the lower ram cam 62.

As already explained with reference to the preceding figures, first the female molds are filled upstream from the first pressure station 18, the first layer is prepressed in the pressure station 18, the female molds are filled upstream from the second pressure station 22, the second layer is prepressed in the pressure station 22 and the main pressing takes place in the main pressure station 24. Downstream from the main pressure station 24, the completely pressed tablet is ejected, indicated here with an arrow 64.

In single-layer operation, the top pressure roll 28 of the first pressure station 18 is removed and the segments 40 and 42 of the upper ram guide 60 are replaced by segment 44. The top pressure roll 30 now acts in the function of a metering roll.

Figure 6:
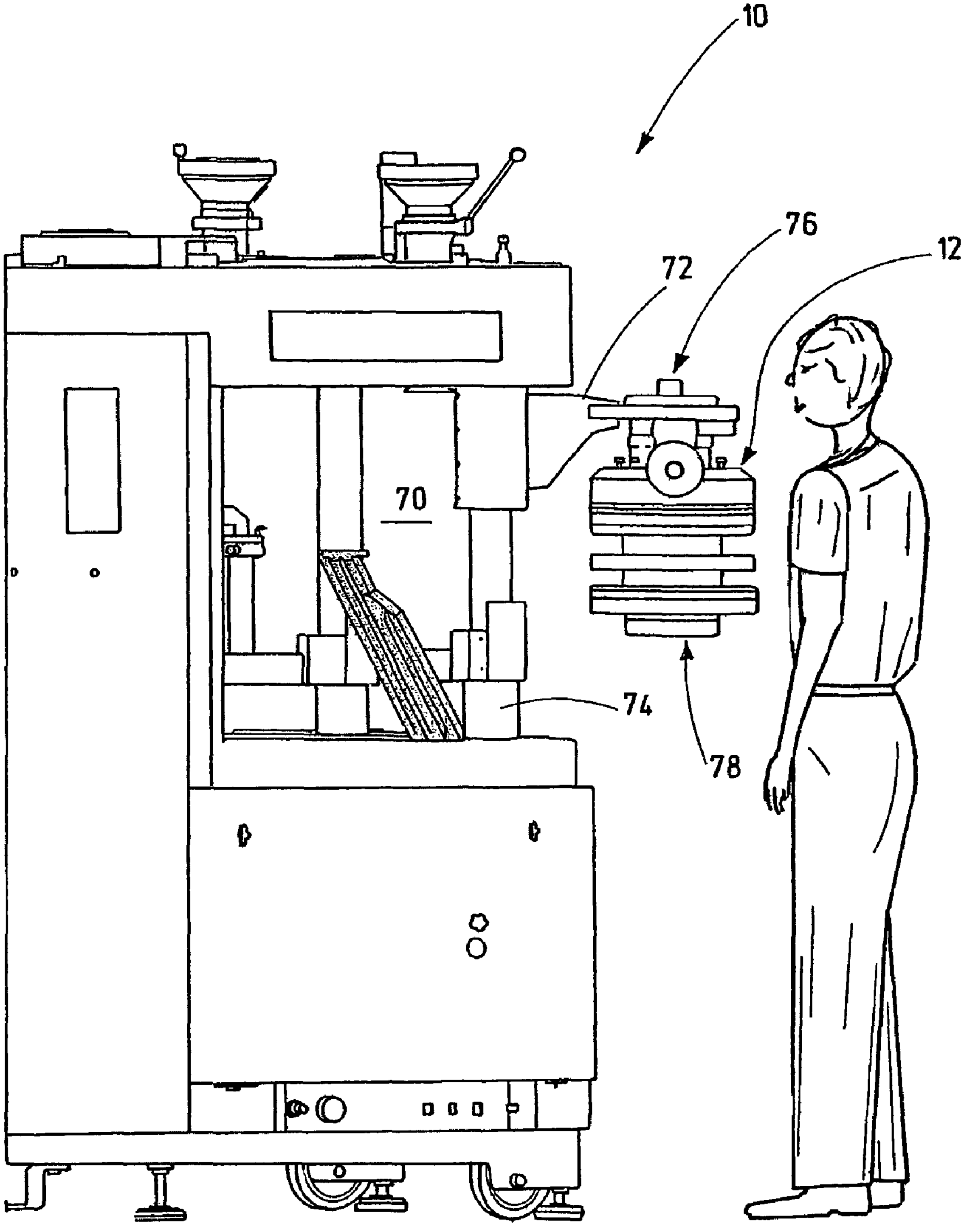

FIG. 6 shows a schematic view of the tableting press 10, illustrating that the rotor 12 can be pivoted completely out of the press interior 20. The rotor 12 is mounted on a support arm 72, which is connected by an articulated joint to a guide pillar 74 of the tableting press 10. The rotor 12 is pivoted out in its horizontal plane of the press interior 70 into the position shown here by a simple pivoting motion. This can be accomplished without dismantling work on the rotor 12. The pressure rolls (the first upper prepressure roll is visible here, for example) and the ram guides, the individual cam segments and the rams themselves on the rotor 12 can still be pivoted out without having to be dismantled first. When the rotor 12 has been pivoted outward, it can be set down by means of a lifting mechanism integrated into the support arm 72, e.g., pneumatically on a rotor wagon or the like (not shown here). It is important that the rotor 12 here can be pivoted out of the press interior 70 without raising or lowering it. This means that the rotor remains essentially in its horizontal plane. There is a drive coupling to a drive machine of the tableting press 10 and/or a counter bearing is provided via the respective end faces 76 and/or 78 of the rotor 12 on corresponding counterparts for a nonpositive assembly.

Figure 7:
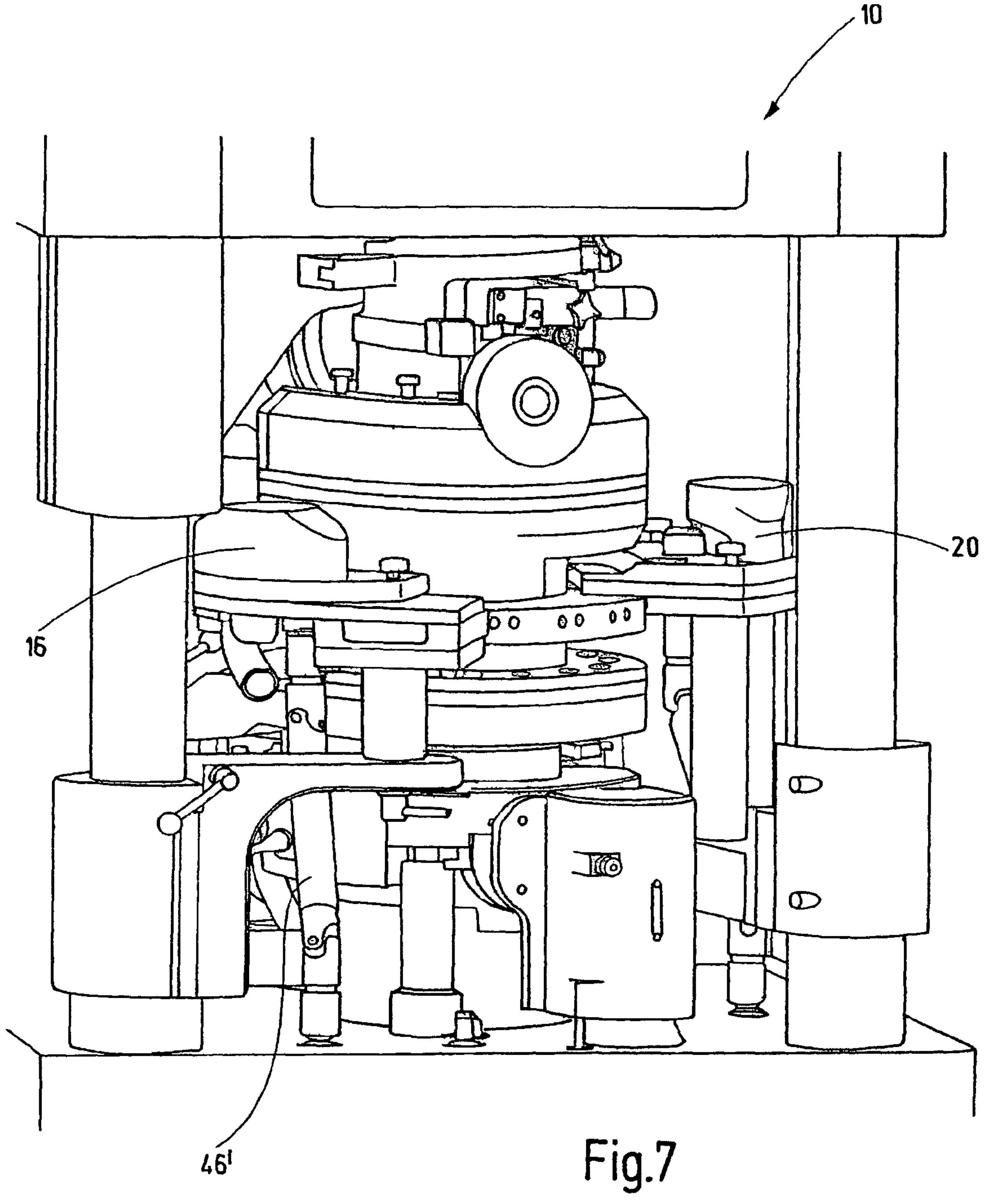
Figure 8:
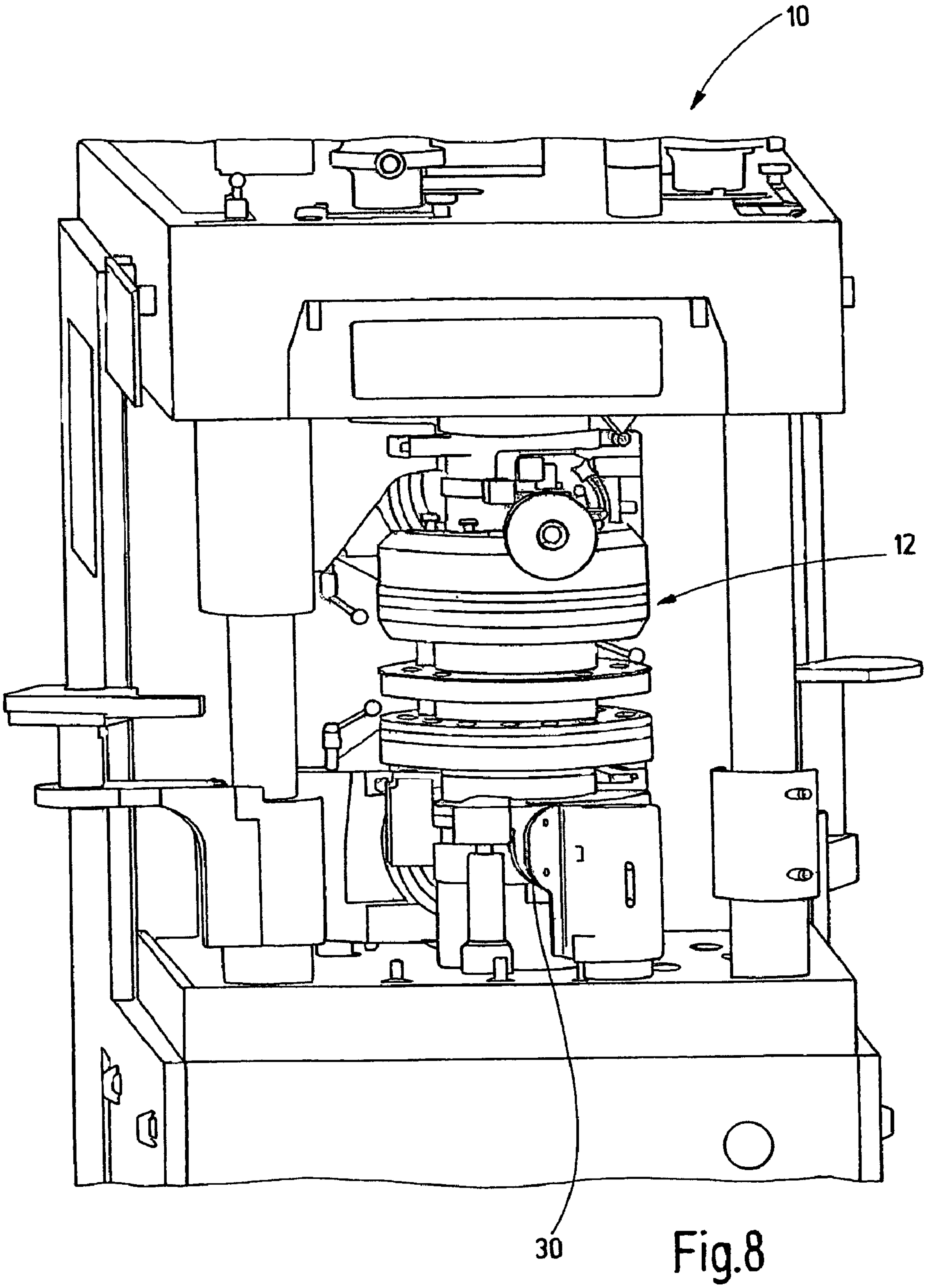

FIGS. 7 and 8 show the tableting press 10 again schematically, illustrating which parts must be removed and/or pivoted in order for the rotor 12 to be pivotable horizontally out of the press interior as shown in FIG. 6.

FIG. 7 illustrates how the first feed mechanism 16' and the second filling device 20 as well as the drive shaft 46' are removed here. The filling cam is also removed.

These parts are removed by releasing the corresponding quick-snap connections or the like without the use of tools.

FIG. 8 illustrates how the parts remaining on the tableting press 10, namely the guide elements and/or holding elements for the feed mechanism 16' and/or the filling device 20 (need not be pivoted) are pivoted out of the area of the rotor 12. Due to the dismantled parts, as shown in FIG. 7, and the pivoted parts, as shown in FIG. 8, it is readily possible to pivot the rotor 12 out of the press interior 70, as illustrated in FIG. 6. This allows simple handling of the tableting press 10, in particular for cleaning purposes, repair purposes and/or replacement of the ram cams and/or female molds on the rotor 12. No complex dismantling work is required.

LIST OF REFERENCE NUMERALS

10 Tableting press
11 Base plate
12 Rotor
14 Female mold table
16 First filling device
16'Feed mechanism
18 First pressure station
20 Second filling device
22 Second pressure station
24 Main pressure station
26 Ejector
28 Top pressure roll
30 Bottom pressure roll
32 Lower ram guide
34 Upper ram guide
36 Upper ram cam
38 Segment
40 Segment
42 Segment
44 Segment
46 Drive shaft
46' Drive shaft
47 Drive adapter
47' Drive adapter
48 Stirrer blade
50 Top main pressure roll
52 Bottom main pressure roll
54 Top pressure roll
56 Bottom pressure roll
60 Upper ram cam
62 Lower ram cam
70 Press interior
72 Support arm
74 Guide pillar
76 End face
78 End face

What is claimed is:

1. A rotary tableting press comprising a rotor, at least one filling station and at least one pressure station as well as a lower ram guide and an upper ram guide, characterized in that the rotary tableting press has a modular design, whereby individual modules can be converted within the rotary tableting press for retooling the rotary tableting press from two-layer operation to single-layer operation or vice-versa.

2. The rotary tableting press according to claim 1, wherein the first filling mechanism and the second filling mechanism are provided, whereby the second filling mechanism is removable.

3. The rotary tableting press according to claim 1, wherein the first filling mechanism can be equipped with an enlarged filling spout.

4. The rotary tableting press according to claim 1, wherein the bottom pressure roll of a second pressure station assumes a metering function in two-layer operation to fill the female molds in single-layer operation.

5. The rotary tableting press according to claim 1, wherein the upper ram guide or the lower ram guide comprises multiple segments, each of which is at least partially replaceable by at least one other segment having a different cam characteristic.

6. The rotary tableting press according to claim 1, wherein the rotary tableting press comprises drive adapters, which are optionally operatively connectable to drive shafts for driving filling mechanisms or parts of filling mechanisms.

7. The rotary tableting press according to claim 1, wherein the rotor can be pivoted out of a press interior of the rotary tableting press.

8. The rotary tableting press according to claim 1, wherein the rotor comprises a receptacle for a support arm, whereby the support arm is pivotably arranged on a guide pillar of the rotary tableting press.

9. The rotary tableting press according to claim 1, wherein a lifting mechanism for covering or raising the rotor is integrated into the support arm.

* * * * *